United States Patent [19]

Boyd

[11] Patent Number: 5,189,453
[45] Date of Patent: Feb. 23, 1993

[54] METHOD AND SYSTEM FOR PRE-EXPOSING INFORMATION ON A FILMSTRIP

[75] Inventor: James D. Boyd, Rochester, N.Y.

[73] Assignee: Eastman Kodak Company, Rochester, N.Y.

[21] Appl. No.: 688,660

[22] Filed: Apr. 19, 1991

[51] Int. Cl.⁵ .......................... G03B 1/00; G03B 17/24
[52] U.S. Cl. .................................. 354/122; 354/107; 354/108; 354/212
[58] Field of Search ............... 354/107, 108, 105, 106, 354/125, 295, 212–216, 21, 110; 352/46, 90, 55; 355/39

[56] References Cited

U.S. PATENT DOCUMENTS

| | | | |
|---|---|---|---|
| 1,396,035 | 11/1921 | Gaisman | 354/108 |
| 3,906,522 | 9/1975 | Carroll | 354/105 |
| 3,916,423 | 10/1975 | Ueda et al. | 354/108 |
| 3,959,803 | 5/1976 | Marvel | 354/105 |
| 4,053,910 | 10/1977 | Bodnar | 354/120 |
| 4,109,260 | 8/1978 | Fujita et al. | 354/106 |
| 4,110,766 | 8/1978 | Fujita et al. | 354/106 |
| 4,123,767 | 10/1978 | Halpern | 354/107 |
| 4,182,559 | 1/1980 | Driscoll et al. | 354/105 |
| 4,370,409 | 1/1983 | Bostroem | 354/105 |
| 4,801,957 | 1/1989 | Vandemoere | 354/147 |
| 4,875,066 | 10/1989 | Rickard | 354/296 |
| 4,994,832 | 2/1991 | Spector | 354/110 |

FOREIGN PATENT DOCUMENTS 3-2737 5/1989 Japan.

Primary Examiner—Michael L. Gellner
Assistant Examiner—Jae N. Noh
Attorney, Agent, or Firm—Ronald Reichman

[57] ABSTRACT

A method and system is disclosed for providing a latent image of information on successive imaging areas of an unexposed filmstrip, so that when a picture is subsequently taken on a specific imaging area, information will appear on a portion of the picture. The foregoing is accomplished by loading a film cartridge in a camera; winding substantially the entire length of filmstrip out of the cartridge and into a film roll; metering the filmstrip one imaging area at a time off the film roll first onto a film gate optically aligned with a taking lens of a camera, and then back into the cartridge; light-projecting information through the taking lens and exposure opening to a relatively small portion of respective imaging areas at the film gate, without exposing the remainder of each imaging area, to provide a latent image of the information on each imaged area; and continuously winding the filmstrip with a latent image of the information on each imaging area, out of the cartridge and into the film roll, so that when the camera is operated to meter an imaging area to the film gate to take a picture the latent image of the information on the imaging area will be precisely located relative to the picture.

16 Claims, 3 Drawing Sheets

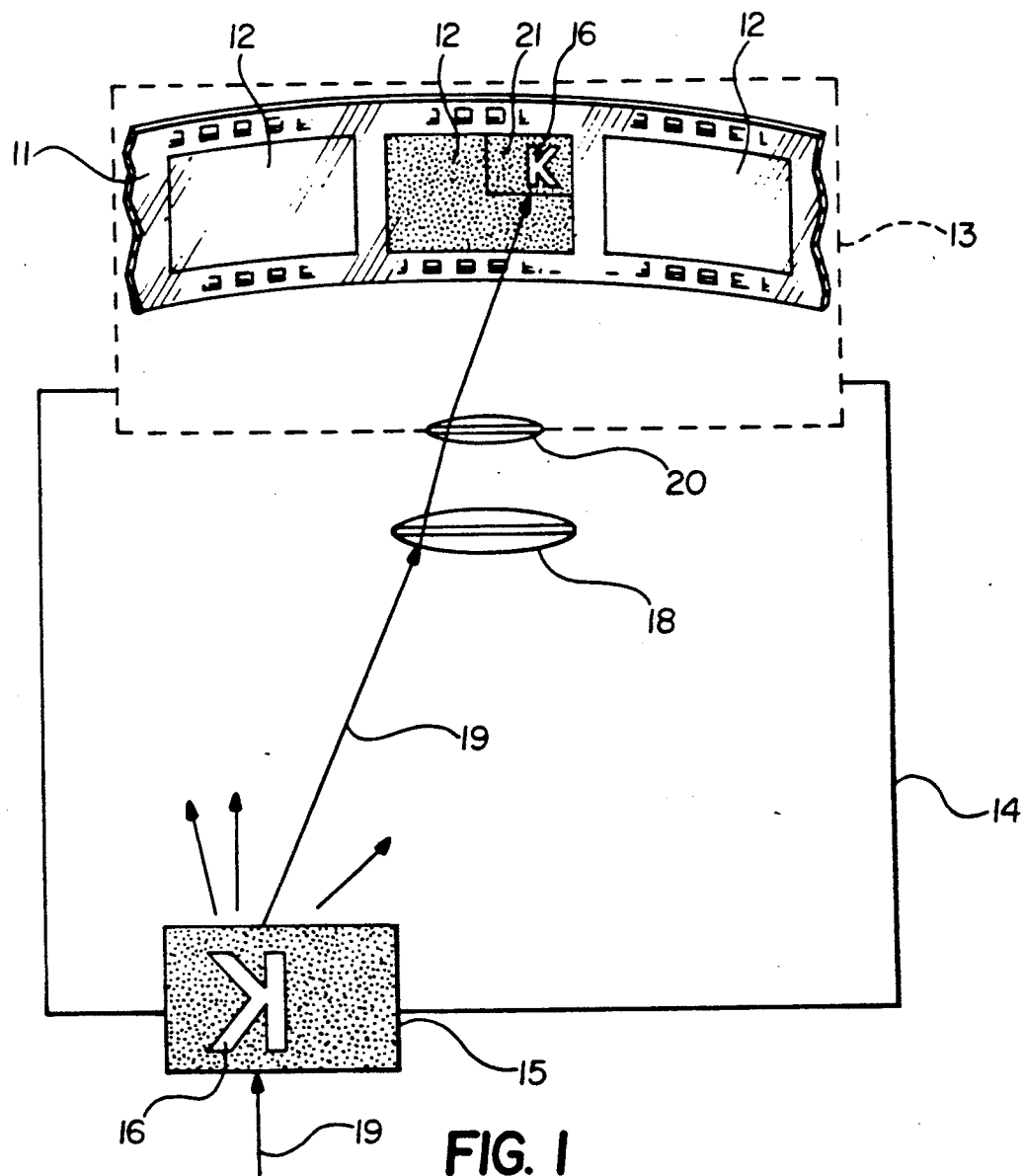
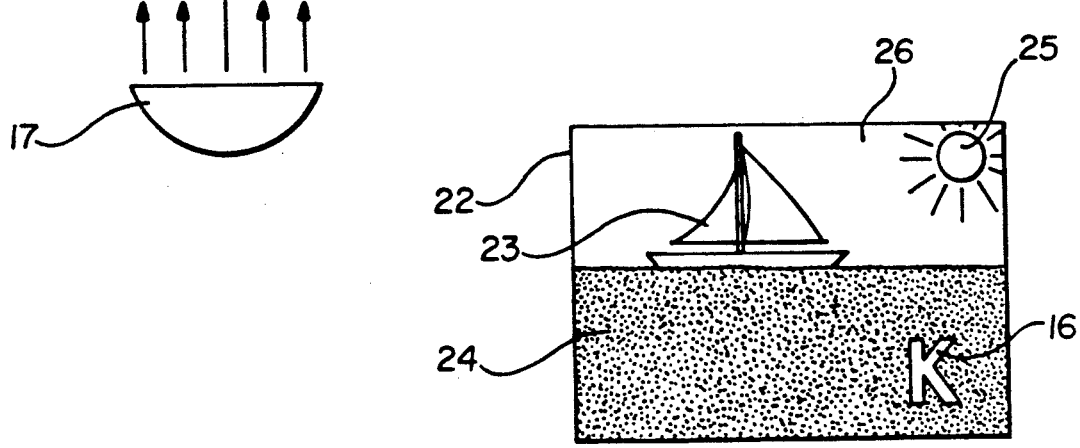
FIG. 1
FIG. 2

METHOD AND SYSTEM FOR PRE-EXPOSING INFORMATION ON A FILMSTRIP

BACKGROUND OF THE INVENTION

1. Field of the Invention

The invention relates generally to the field of photography, and particularly to a method and system for pre-exposing information on a filmstrip.

2. Description of the Prior Art

Single use cameras have been developed in which the camera manufacturer loads an unexposed film cartridge into the supply chamber of the camera, and continuously winds substantially the entire length of the filmstrip out of the cartridge into a film roll contained within the camera. When the customer exposes and winds all available imaging areas on the filmstrip back into the cartridge, the single-use camera is sent to a photofinisher who removes the filmstrip from the single-use camera. The filmstrip is then processed, and the single-use camera is discarded or recycled.

Sometimes the purchaser of a single-use camera wants to customize the photographic prints or slides received from the single-use camera. The customization may consist, for example, of a specific symbol, indicia, figure, message, or corporate logo, etc. on a portion of each print or slide.

The prior art placed indicia on a portion of each print or slide by adding a small transparent plate (containing the desired indicia) or small transparent strip (containing the desired indicia) into the light path within regular cameras or single-use cameras. The indicia on the transparent plate or the indicia on the transparent strip would block incoming light during exposure of the filmstrip and a shadow image of the indicia on the transparent plate or transparent strip would appear on the resulting print or resulting slide. Some of the disadvantages of the foregoing method are: the appearance of a black edge around the indicia on the resulting print or resulting slide; the degradation of image quality surrounding the indicia on the resulting print or slide due to the passage of light-forming rays through the transparent medium; the limitation of shadow images necessarily being black in color and therefore not readily visible against dark backgrounds; the cost of an extra part added to the camera; and the necessity of adding the information to all available imaging areas on the filmstrip.

SUMMARY OF THE INVENTION

The present invention overcomes the disadvantages of the prior art by providing a pre-exposure system that places a latent image of indicia, symbols, figures, a drawing or a corporate logo, etc., hereinafter called information on successive imaging areas of an unexposed filmstrip, that is contained within a camera. This is achieved by:

continuously winding the filmstrip out of a cartridge and into a film roll;

metering the filmstrip one imaging area at a time off the film roll, first onto a film gate optically aligned with a taking lens of the camera, and then back into the cartridge;

light-projecting information through the taking lens and the exposure opening to a relatively small portion of respective imaging areas at the exposure opening, without exposing the remainder of each imaging area, to provide a latent image of the information on each imaged area; and continuously winding the filmstrip, with a latent image of the information on each imaging area, out of the cartridge and into the film roll, whereby when the camera is operated to meter an imaging area to the exposure opening to take a picture the latent image of the information on the imaging area will be precisely located relative to the picture.

Thus, as photographers take pictures with the above camera, exposures are made on top of the pre-exposed information image and since the filmstrip is in registration with the metering system of the camera during the winding operations, frame to frame positioning is maintained. Hence, on each print or on each slide, the information contained on the transparency will appear at the same location.

It is an object of this invention to provide a new and improved pre-exposure system and method that places information in a specified area of each imaging area of a filmstrip contained within a camera so that when a picture is subsequently taken with the camera information will appear at the same location on each print or on each slide.

It is another object of this invention to provide a new and improved pre-exposure system and method for producing bright information (of any color), which is visible against any background, on a portion of each picture.

It is a further object of this invention to provide a new and improved pre-exposure system and method for eliminating black edges around information appearing in prints or slides.

It is a further object of this invention to provide a new and improved pre-exposure system and method that has no degradation of surrounding image quality due to the passage of light-forming rays through a transparent medium.

Other objects and advantages of this invention will become apparent as the following description proceeds, which description should be considered together with the accompanying drawings.

BRIEF DESCRIPTION OF THE DRAWINGS

FIG. 1 is a general overall schematic drawing of this invention;

FIG. 2 is a diagram of a photograph of a boat showing the information pre-exposed on filmstrip 11;

DESCRIPTION OF A PREFERRED EMBODIMENT

Figure 3:
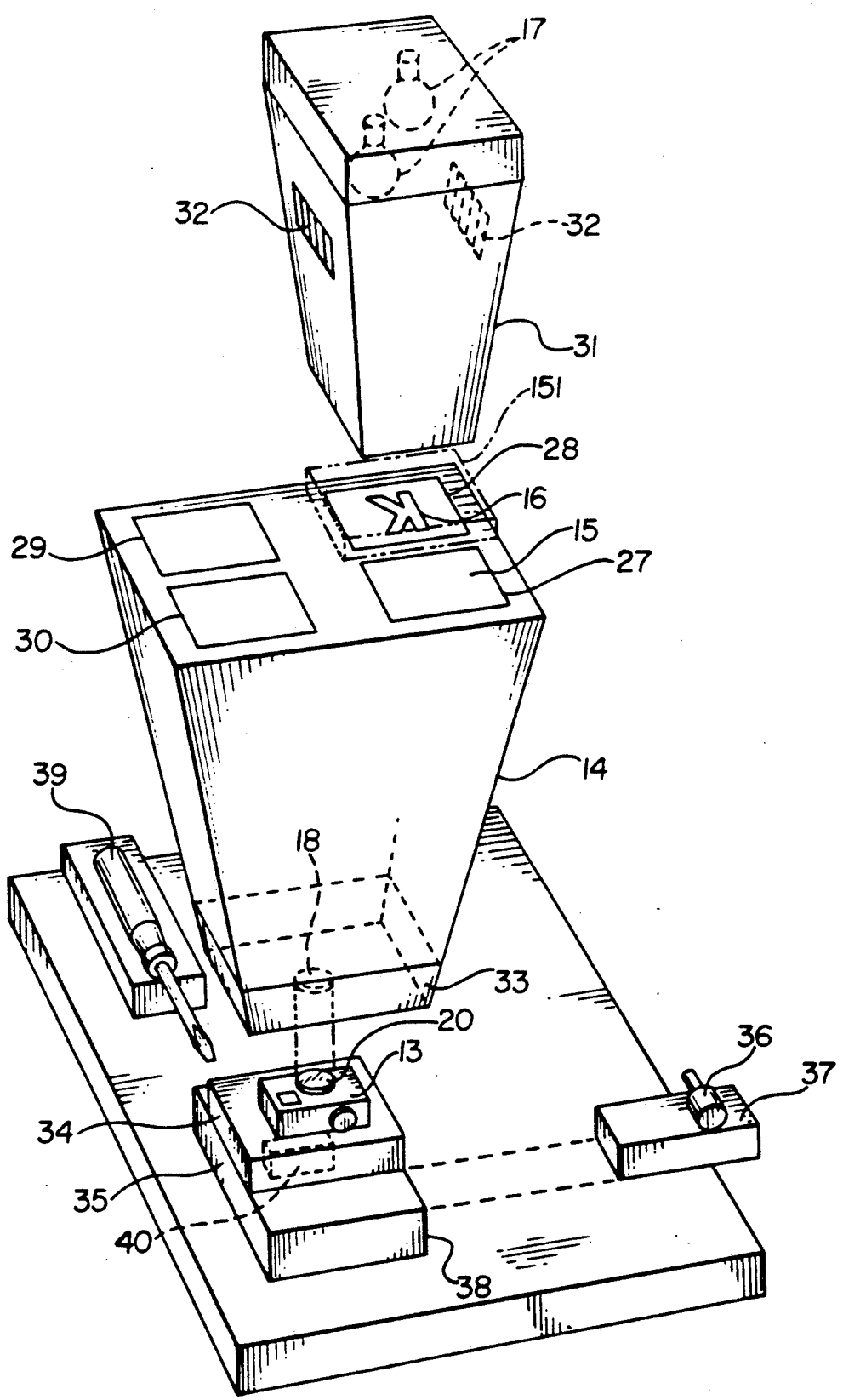
FIG. 3 is a perspective representation of the apparatus of this invention.

Referring now to the drawings in detail, and more particularly to FIG. 1, the reference character 11 represents a filmstrip that has a plurality of potential imaging areas 12. Filmstrip 11 is contained within camera 13 and filmstrip 11 has been wound out of the cartridge (not shown) and into a film roll (not shown). Camera 13 is positioned at one of the ends of light-tight box 14 and transparency 15 containing information 16 is positioned at the other end of box 14. A diffuse light source 17 is positioned outside box 14 behind transparency 16 to back-light box 14 with white light.

Diopter lens 18 is placed in front of camera taking lens 20 to focus the image of information 16 at location 21 of imaging area 12. Filmstrip 11 will be wound one imaging area at a time and the shutter of camera 13 tripped as location 21 of each imaging area 12 is individually exposed to light emitted by light source 17. Thus, information 16 will appear at a specific area of location 21 as a latent image when light from source 17 reaches location 21 via light imaging path 19, i.e., the light from source 17 will travel through transparency 15, lenses 18 and 20 to focus the image of information 16 at a specific area of location 21.

The shutter of camera 13 will be tripped 12 times if filmstrip 11 has room for 12 pictures and 24 times if filmstrip 11 has room for 24 pictures, or 36 times if filmstrip 11 has room for 36 pictures. Each shutter trip produces a nearly identical latent pre-exposure of information 16 on filmstrip 11 (varying only by the small shutter speed variations of each camera when using a constant light source, or by miniscule variations in flash output if using a stroboscopic flash).

Camera 13 is removed from light-tight box 14 (and filmstrip 11 is rewound) and another camera is positioned at the previous location of camera 13 and the above procedure is repeated. As photographers subsequently take pictures with camera 13, exposures are made on all portions of imaging area 12 including those portions of areas 12 that contain information 16. Since filmstrip 11 stays in registration with the metering system of camera 13 during the winding operations, frame to frame positioning is maintained and prints or slides similar to the one shown in FIG. 2 may be obtained.

If a photographer used camera 13 to take a picture of a sailboat on a lake, a print similar to the one shown in FIG. 2 would be obtained. Sailboat 23 would be sailing on lake 24, while sun 25 is shining in sky 26 and information 16 will appear in the lower right-hand corner of print 22.

FIG. 3 is a perspective representation of the apparatus of this invention. A black-and-white or full color transparency 15 (with a black background) containing information 16, is positioned into logo frame 151. Logo frame 151 may contain a diffusion plate, a color correcting filter and/or color gel filters. Frame 151 is positioned at location 27, 28, 29 or 30 of light-tight box 14. In this instance frame 151 is positioned at location 28. When frame 151 is placed at location 28, information 16 will appear at the lower right-hand corner of print 22, i.e., at the position information 16 is shown in FIG. 2. If frame 151 was placed at location 27, information 16 will appear in the upper right-hand corner of print 22 and if frame 151 was placed at location 29, information 16 would appear in the lower left-hand corner of print 22. The placement of frame 151 in location 30 will cause information 16 to appear in the upper left-hand corner of print 22.

Box 14 is backlit with white light that radiates from light source 17. Light source 17 is affixed to one of the ends of lamp funnel 31. Lamp funnel 31 may have exhaust fans 32 mounted on two opposing walls of funnel 31 and funnel 31 is positioned above frame 151. Light source 17 may be a incandescent lamp, i.e. a quartz-halogen flood light or, for more precise exposure repeatability, a stroboscopic flash (not shown) which is synchronized to fire when the shutter of camera 13 is open. This stroboscopic flash is synchronized to camera 13 by connecting the trigger wires of the stroboscopic flash to the flash synchronization ports of camera 13.

The light intensity is adjusted so as to provide near-maximum density exposure on the negative (based upon the camera's shutter speed and aperture and the film's ISO rating). Slight variations in light intensity can be employed to compensate for information positioning or intended usage, i.e., lower-corner information on outdoor snow scenes requires extra pre-exposure.

Camera 13 contains filmstrip 11 (not shown) that is wound out of the film cartridge and into a film roll or film storage area (not shown). The Fun Saver 35mm single-use camera manufactured by Eastman Kodak Company may be used as camera 13. Camera 13 is positioned on block 34 and block 34 is mounted on block 35. Automatic wind mechanism 40 is coupled to camera 13 to automatically wind filmstrip 11. Pneumatic trip mechanism 36 is mounted on block 37 and block 37 is mounted on block 38. Mechanism 36 is used to trip the shutter of camera 13. Rewind device 39 is coupled to film roll 43 (shown in FIG. 4) of camera 13 to rewind filmstrip 11 from the cartridge into a film roll. Device 39 may be a screwdriver or a powered screwdriver. The manner in which filmstrip 11 is wound and rewound on camera 13 will be more fully set forth in the description of FIG. 4.

Diopter lens 18 is mounted in diopter housing 33 of light-tight box 14. Diopter lens 18 is used to shorten the minimum focus distance of taking lens 20 (not shown). Typically camera 13 will have a taking lens that has a minimum focus distance of approximately four feet. Thus, if lens 18 was not used box 14 would have to be 4 feet or larger. The use of diopter lens 18 permits box 14 to be approximately one foot long. Taking lens 20 is placed in optical alignment with diopter lens 18.

Figure 4:
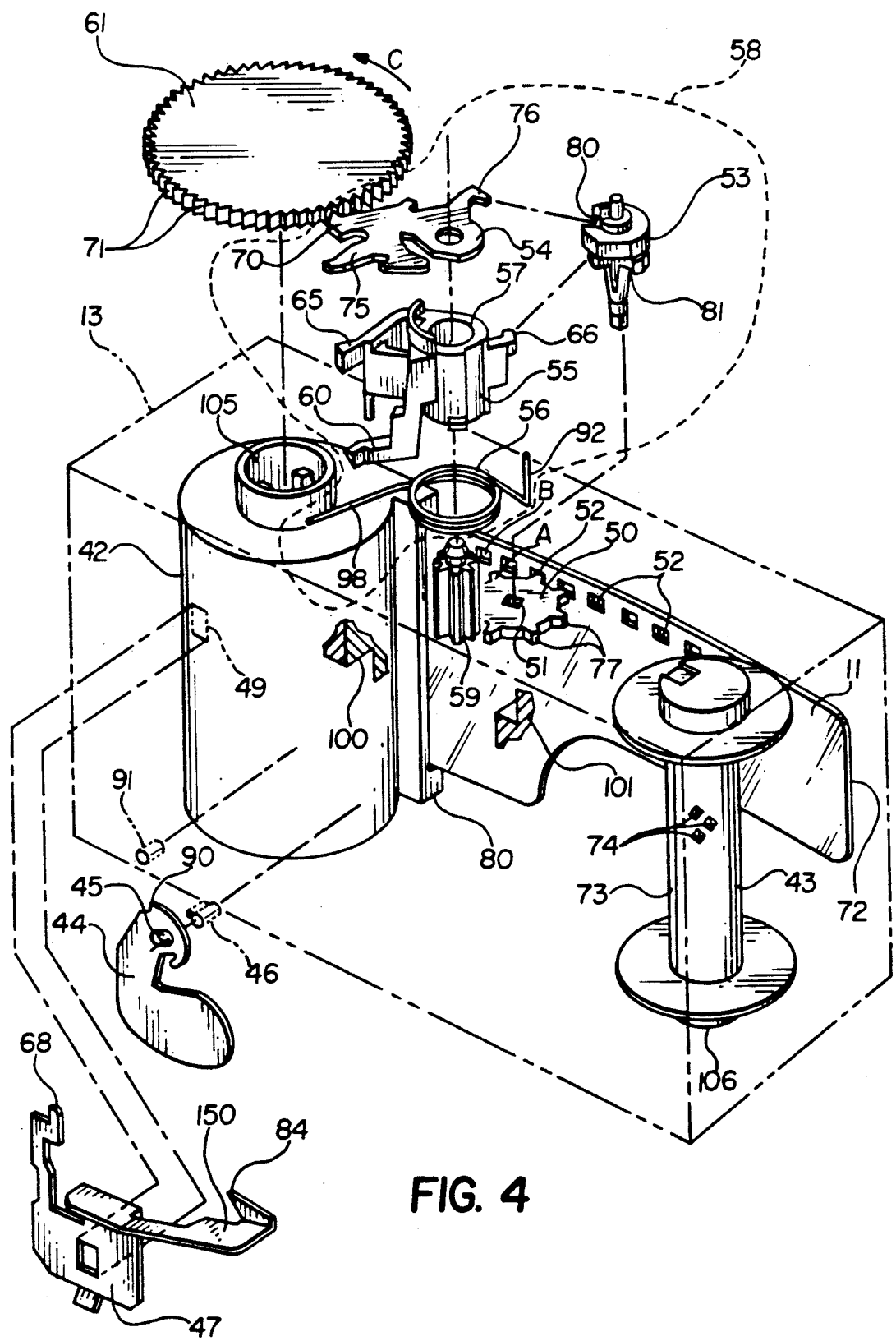
FIG. 4 is an expanded view of the winding and rewinding mechanism of camera 13, which is shown in FIG. 3.

FIG. 4 is a perspective representation of the components of camera 13 that are used to wind and rewind filmstrip 11 from cartridge 42 to film roll 43. Shutter blade 44 contains an orifice 45 and frame post 46 is connected to the frame (not shown) of camera 13. Frame post 46 is placed within orifice 45. A shutter spring (not shown) is used to hold blade 44 in the orientation shown in FIG. 4, yet allow blade 44 to move in a clockwise direction. Trigger latch 47 has an arm 68 and arm 150. Arm 150 has a latch point 84. Trigger latch 47 is positioned to the frame of camera 13 at tab 49. Sprocket 50 has an opening 51 at its center and teeth 77 along its circumference.

Cam 53 has recesses 80 and 81 and is dropped through a hole in the frame of camera 13 (not shown) and pushed into opening 51 of sprocket 50. Metering lever 55 has legs 60, 65 and 66 protruding from its hub. High energy assembly 58 comprises high energy lever 55, metering lever 54 and high energy spring 56. High energy spring 56 is assembled to high energy lever 55 and then metering lever 54 is assembled to top surface 57 of lever 55 and retained by spring leg 92 of high energy spring 56. Assembly 58 is positioned over frame post 59 of camera 13. Then leg 98 of spring 56 is placed beneath overhanging ledge 100. Ledge 100 is located in the frame of camera 13. When leg 98 is placed in ledge 100, assembly 58 rotates about frame post 59 until high energy leg 60 pushes against opposite frame wall 101 of camera 13 or leg 66 pushes against cam 53. Thumbwheel 61 is placed in an orifice in the frame of camera 13 so that thumbwheel teeth 71 push against anti-backup leg 68 of trigger latch 47. In the above position metering leg 70 of metering lever 54 is aligned with teeth 71 of thumbwheel 61. End 72 of filmstrip 11 from cartridge 42 is pressed through slot 73 of film roll 43 and retained by pressure darts 74 (that are affixed to roll 43). Cartridge 42 and film roll 43 are placed on the back of the frame of camera 13 so that spool 105 of cartridge 42 meshes with a projection (not shown) on the bottom of thumbwheel 61 by passing through an orifice in the frame of camera 13, and film sprocket hole 52 meshes with a tooth 77 of sprocket 50.

The initial winding of filmstrip 11 out of cartridge 42 and into film roll 43 is accomplished by pushing leg 65 of lever 55 to the left so that leg 66 is not touching cam 53. Leg 75 of metering lever 54 is pushed to the right so that leg 76 of lever 54 is not touching cam 53 and leg 70 of lever 54 is not touching thumbwheel 61. Anti-back-up leg 68 of latch 47 is pulled away from thumbwheel 61 clearing thumbwheel teeth 71. At this point, filmstrip 11 may be driven from cartridge 42 onto film roll 43.

An automatic rewind device like a powered screwdriver (not shown) meshes with slot 106 of film roll 43, rotating roll 43 in a clockwise direction (as viewed from above). Filmstrip 11 is pulled from cartridge 42 causing thumbwheel 61, sprocket 50 and cam 53 to spin freely. Each subsequent tooth 77 on sprocket 50 meshes with a subsequent sprocket hole 52. Thus, tooth A of sprocket 50 will mesh with sprocket hole B. The prewind process continues until most of the remaining filmstrip 11 contained in cartridge 42 has been unwound from cartridge 42, and the tape which attaches the end of filmstrip 11 to spool 105 of cartridge 42 is pulled partially through slot 80 of cartridge 42. High energy lever 55, metering lever 54 and anti-back-up leg 68 of trigger latch 47 are then released.

Subsequent winding of filmstrip 11 is accomplished by having the camera operator's thumb or a mechanical substitute rotate thumbwheel 61 in the direction shown by arrow C. The above rotates spool 105 of cartridge 42, thereby pulling filmstrip 11 into cartridge 42 and causing film roll 43, sprocket 50 and cam 53 to rotate. The rotation of cam 53 causes leg 66 of high energy lever 55 to move to the causing lever 55 to rotate thereby forcing leg 65 and leg 60 to move past trigger latch point 84 and shutter blade trip point 90 respectively.

Metering of filmstrip 11 is accomplished during the continued rotation of cam 53. The operator winds thumbwheel 61 until recess 81 of cam 53 has aligned itself with leg 66 of high energy lever 55. At this point the force from high energy spring 56 causes high energy lever 55 to snap backwards allowing leg 65 of high energy lever 55 to pull back against latch point 84 of trigger latch 47.

A fraction of a revolution after the foregoing, leg 76 of metering lever 54 encounters recess 80 in cam 53. The force from leg 92 of high energy spring 56 causes metering lever 54 to snap backwards, driving leg 70 of metering lever 54 sharply into engagement with teeth 71 on rotating thumbwheel 61. The above actions lock thumbwheel 61, preventing the operator from pulling more of filmstrip 11. The total length of film pulled is equivalent to the distance between eight sprocket holes 52. The reason for the above is that there are eight teeth 77 on sprocket 50.

Frames on filmstrip 11 are pre-exposed by having someone or something push the shutter button (not shown) of camera 13 which pushes leg 150 of trigger latch 47 down until leg 65 of high energy lever 55 is released. High energy spring 56 rotates high energy lever 55 such that leg 60 of lever 55 hits trip point 90 on shutter blade 44 causing blade 44 to rotate upwards, hit frame post 91 of camera 13 and rebound back to its initial position. High energy lever 55 continues to rotate, until leg 60 hits rigid frame wall 101. The hitting of wall 101 causes lever 55 to stop rotating.

Meanwhile, leg 92 of high energy spring 56 which is hooked near leg 75 of metering lever 54 pulls leg 70 of metering lever 54 out of engagement with teeth 71 of thumbwheel 61. This allows camera 13 to be wound to the next frame by rotating thumbwheel 61.

As long as sprocket holes 52, sprocket teeth 77 and cam 53 remain properly meshed, consistent registration of filmstrip 11 will be maintained. The very same sprocket tooth will always be in contact with the same sprocket hole at the end of a rewinding cycle no matter how many times camera 13 is wound and rewound. Since registration has been maintained, when a photographer subsequently takes a picture with camera 13, the pre-exposed information 16 (not shown) on filmstrip 11 will appear in the same relative location on each subsequent exposure.

After 12, 24, 36, etc. cycles of winding and tripping camera 13, which results in filmstrip 11 being substantially wound into cartridge 42, filmstrip 11 is again wound out from cartridge 42 and into film roll 43 as previously described.

The above specification describes a new and improved method and system for providing a latent image of information on successive imaging areas of an unexposed filmstrip so that when a picture is subsequently taken on a specific imaging area, information will appear at the same location on each print or slide. It is realized that the above description may indicate to those skilled in the art additional ways in which the principles of this invention may be used without departing from the spirit. It is, therefore, intended that this invention be limited only by the scope of the appended claims.

What is claimed is:

1. A method of providing a latent image of information on successive imaging areas of an unexposed filmstrip, windable from and back into a cartridge inside a camera, which comprises the steps of:
   (1) continuously winding the filmstrip out of the cartridge and into a film roll in the camera until substantially the length of the filmstrip forms the film roll, but leaving a trailing end portion of the filmstrip contained within the cartridge;
   (2) metering the filmstrip one imaging area at a time off the film roll, first onto a film gate optically aligned with an exposure opening and a taking lens of the camera, and then back into the cartridge;
   (3) light-projecting information through the taking lens and the exposure opening to a relatively small portion of respective imaging areas at the film gate, without exposing the remainder of each imaging area, to provide a detailed latent image of the information on each imaged area; and
   (4) continuously winding the filmstrip, with a latent image of the information on each imaging area, out of the cartridge and into the film roll,
   whereby when the camera is operated to meter an imaging area to the film gate to take a picture, the latent image of the information on the imaging area will be precisely located relative to the picture.

2. The method as recited in claim 1 wherein the second includes:
   rotating the film spool inside the cartridge in a manner such that a predetermined length of film, equalling the distance between respective points on adjacent imaging areas, will move off the film roll onto a film gate optically aligned with the taking lens of the camera, and then back into the cartridge.

3. The method as recited in claim 1, wherein the third step includes light-projecting information through a transparent or translucent medium which defines the information.

4. The method as recited in claim 1, wherein the second and third steps include:
rotating the film spool inside the cartridge in a manner such that a predetermined length of film equalling the distance between respective points on adjacent imaging areas will move off the film roll onto a closed film gate optically aligned with the taking lens of the camera;
opening the exposure opening to take a picture; and
performing the above two steps until a picture has been taken on all of the imaging areas of the filmstrip.

5. A system for superimposing information on each available imaging area of a filmstrip, said system comprising:
an enclosure, having a first and second opening;
a camera that is mounted at the first opening of said enclosure, said camera having a filmstrip that is prewound to a storage area contained within said camera and a metering system that preserves film registration throughout winding and picture taking cycles;
a transparent or translucent material containing information that is mounted at the second opening of said enclosure;
illuminating means mounted outside said enclosure second opening behind said transparent material for supplying near maximum light density on said filmstrip;
means for winding said filmstrip to the first and subsequent imaging areas, said winding means is coupled to said camera;
means for tripping the shutter of said camera thereby exposing a portion of the first and subsequent imaging areas of said filmstrip with an image of the information; and
means for prewinding said filmstrip back into the storage area of said camera, so that when a picture is taken with said camera, a detailed latent image of the information will appear at the same location on each imaging area of the filmstrip.

6. The system claimed in claim 5 wherein said camera is a single-use camera.

7. The system claimed in claim 5 wherein said camera is a disposable single-use camera.

8. The system claimed in claim 5 wherein said enclosure is a box.

9. The system claimed in claim 5 wherein said transparent or translucent material is a black and white or color sheet film negative.

10. The system claimed in claim 5 wherein said illuminating means comprises: one or more incandescent lamps.

11. The system claimed in claim 5 wherein said illuminating means comprises: a stroboscopic flash that is synchronized to fire when the shutter of said camera is open.

12. The system claimed in claim 5 wherein said winding means is an automatic wind mechanism.

13. The system claimed in claim 5 wherein said tripping means is a pneumatic trip mechanism.

14. The system claimed in claim 5 wherein said prewinding means comprises:
a rotating device that is coupled to the film roll in the storage area of said camera whereby the rotation of said device causes the filmstrip to be pulled from the cartridge and onto the film roll.

15. The system claimed in claim 14 wherein said rotating device is a screwdriver.

16. The system claimed in claim 14 wherein said rotating device is a powered screwdriver.

* * * * *